June 11, 1929.　　　　L. F. KIDD　　　　1,716,856

SHOCK ABSORBING STEERING WHEEL

Filed Oct. 18, 1927

INVENTOR
*L. F. Kidd*
BY
ATTORNEY

Patented June 11, 1929.

1,716,856

UNITED STATES PATENT OFFICE.

LEO F. KIDD, OF STOCKTON, CALIFORNIA.

SHOCK-ABSORBING STEERING WHEEL.

Application filed October 18, 1927. Serial No. 226,834.

This invention relates to steering wheels of automobiles, my principal object being to provide a wheel of this general character so constructed that the majority if not all of the vibrations usually transmitted to the wheel through the interconnecting steering mechanism will be absorbed in the rim of the wheel and will not be imparted to the hands and body of the driver.

Automotive engineers have long recognized the desirability of reducing vibrations in the vehicles as much as possible to enhance the comfort of the occupants as well as to add to the life of the machinery of the car. To this end efforts so far have all been directed to increasing the resiliency and give of the tires and the seat cushions; in improving the spring suspension mechanism; and in insulating the motor and body from the frame by rubber or like shock absorbing mediums. The steering mechanism of the car however is not affected to any great extent by the above improvements, and considerable vibration is transmitted to the steering wheel. Inasmuch as the driver must maintain a hold on the wheel all the time he is driving he is constantly subjected to the vibrations imparted to his hands, arms and body from the steering wheel. As a result a very tiring effect after driving continually for any great distance is had.

My improved wheel, absorbing as it does practically all objectionable vibrations transmitted thereto from the steering mechanism, therefore makes driving a less tiring operation, as will be evident.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views.

Figure 1:
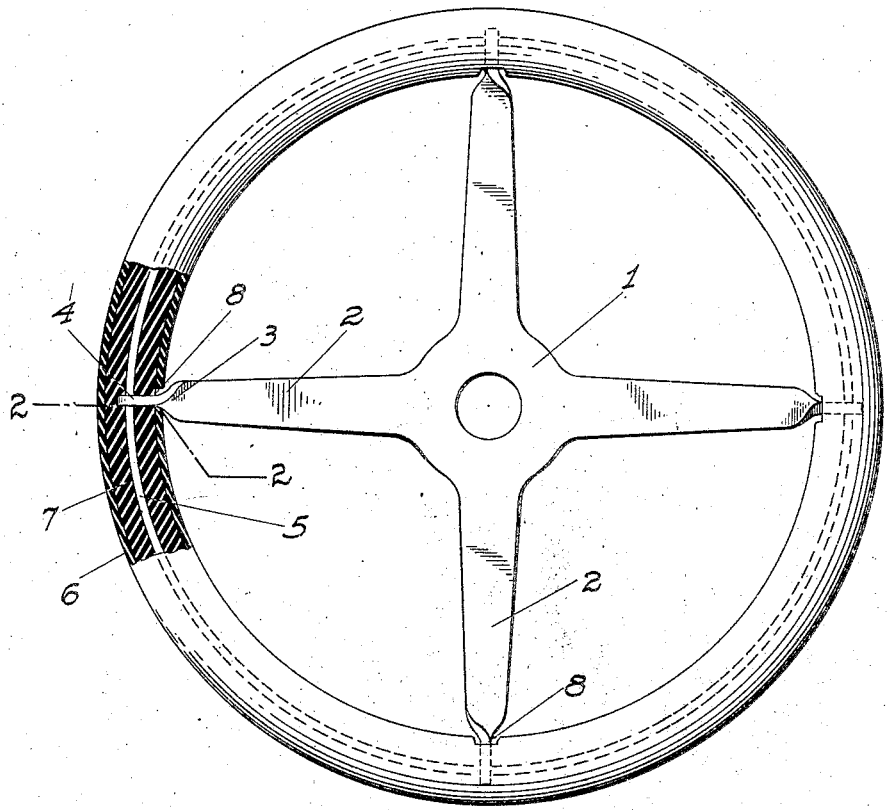
Fig. 1 is a plan view of my improved wheel with the rim partly broken out to show the interior construction.
Figure 2:
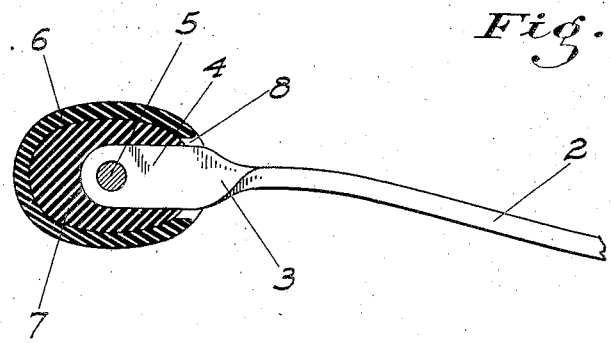
Fig. 2 is a fragmentary cross section of the wheel on the line 2—2 of Fig. 1.

Referring now more particularly to the characters of reference on the drawings, the wheel as usual comprises a metal spider consisting of a hub 1 for engagement with the steering column and spokes 2 radiating from the hub.

Adjacent their outer ends the spokes are twisted as at 3 or otherwise treated to form lugs 4 which are disposed parallel with the axis of the hub, these lugs being orificed and having a stiff rod or wire 5 projecting therethrough to form a continuous endless core, said wire being circular and concentric with the hub. Surrounding the core and lugs in spaced relation thereto is a shell 6 of hard rubber or the like, forming the exterior rim or gripping element of the wheel. The space inwardly of the shell is filled with sponge rubber 7 or similar shock absorbing material which closely surrounds the wire core and the spoke lugs; the shell being vulcanized or otherwise cemented to the filler. The shell at the points where the spokes project therefrom is cut away a short distance about said spokes as shown at 8 so as not to ordinarily contact therewith.

As a result of this construction it will be seen that the vibrations which are unavoidably transmitted to the spokes from the steering mechanism are absorbed by the filler material of the wheel and are not transmitted to the outer shell which is engaged by the hands of the driver, the shell being maintained in a floating condition on a cushion of shock absorbing material throughout its extent. When the wheel is turned sharply the edges of the openings 8 may contact with the spokes, due to the give of the filler, but such contact will be momentary and but little vibratory effect will be felt by reason of such contact. The rigid wire core keeps the relatively soft filler in a proper position and prevents any appreciable out-of-center movement of the shell relative to the hub.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claim.

Having thus described my invention what I claim as new and useful and desire to secure by Letters Patent is:

A shock-absorbing steering wheel comprising a hub having spokes radiating therefrom, a circular non-yieldable shell concentric with the hub and into which the outer ends of the spokes project in non-contracting relationship, and a shock absorbing material filling the shell and in which the ends of the spokes are embedded.

In testimony whereof I affix my signature.

LEO F. KIDD.